United States Patent [19]

Schilling et al.

[11] Patent Number: 4,614,600
[45] Date of Patent: Sep. 30, 1986

[54] CORROSION INHIBITORS

[75] Inventors: Peter Schilling; David V. Braddon, both of Charleston, S.C.

[73] Assignee: Westvaco Corporation, New York, N.Y.

[21] Appl. No.: 666,971

[22] Filed: Oct. 31, 1984

[51] Int. Cl.[4] .................. C23F 11/04; E21B 43/27
[52] U.S. Cl. ................... 252/8.553; 252/148; 252/391; 252/392; 422/12
[58] Field of Search .......... 252/8.55 E, 8.55 C, 252/8.55 R, 392, 148; 422/12

[56] References Cited

U.S. PATENT DOCUMENTS

| | | | |
|---|---|---|---|
| 2,468,163 | 4/1949 | Blair et al. | 252/8.55 |
| 2,598,213 | 5/1952 | Blair | 252/8.55 |
| 2,966,458 | 12/1960 | Counts | 252/8.55 |
| 3,107,221 | 10/1963 | Harrison et al. | 252/8.55 X |
| 3,134,759 | 5/1964 | Kirkpatrick et al. | 252/8.55 X |
| 3,687,847 | 8/1972 | Maddox et al. | 252/8.55 |
| 3,931,029 | 1/1976 | Dutton et al. | 252/392 X |
| 4,344,861 | 8/1982 | Levy | 252/8.55 |
| 4,447,269 | 5/1984 | Schreuders et al. | 252/311.5 X |

OTHER PUBLICATIONS

Foster et al, article in *Industrial and Engineering Chemistry*, vol. 51, No. 7, Jul. 1959, pp. 825–828.

*Primary Examiner*—Herbert B. Guynn
*Attorney, Agent, or Firm*—Terry B. McDaniel; Richard L. Schmalz

[57] ABSTRACT

An anti-corrosive composition is disclosed which comprises the condensate of a polyamine such as diethylenetriamine, triethylenetetramine or aminoethylethanol amine with a 21 or 22 carbon fatty polycarboxylic acid or acid anhydride. The composition may additionally include the condensation products of the above polyamines with either tall oil fatty acids or Rosin S. Propargyl alcohol has been found to enhance the anti-corrosive effects of the composition. The compositions are especially useful in well drilling operations where a strong inorganic acid is used to facilitate crude oil flow.

28 Claims, No Drawings

CORROSION INHIBITORS

BACKGROUND OF THE INVENTION

(1) Field of the Invention

The present invention relates to compositions and methods for inhibiting the corrosive effects of acids on metal pipes. More particularly, the present invention relates to compositions formed by the condensation of a polyamine with tall oil and its derivatives and/or with particular 21 or 22 carbon unsaturated fatty acid or acid anhydrides. Such compositions have been found to be especially effective at protecting metal pipes during oil well stimulation operations where a 15–30% acid solution is used to increase production in oil wells or in the other operations where ferrous metal surfaces are exposed to strong acidic environments, such as pickling baths and industrial cleaning.

(2) Description of the Prior Art

To increase reservoir productivity by acidizing, a corrosive fluid is pumped down into a limestone or dolomite formation to improve formation permeability. The fluid must etch flow channels and dissolve debris to restore the original drainage patterns. In fracture acidizing, acid is pumped down the hole under a pressure greater than the formation pressure creating new channels by fracture. Matrix acidizing is performed by injecting acid at lower pressure than the formation pressure, enlarging the existing flow channels.

Hydrochloric acid (15–30% concentration) alone or blends with hydrofluoric acid or acetic acid are commonly used for this purpose, and to a lesser extent phosphoric acid. Most of the corrosion inhibitors which are being used to protect the steel pipes through which they are pumped into the formations are blends of amines such as dodecyl amines, alkyl aquinolines, alkyl pyridines and acetylenic ethanols, with propargyl alcohol being the most widely used. Compositions for these applications are disclosed in U.S. Pat. Nos. 3,816,322 to Griffin et al., 3,802,890 to Keeney.

Ferrous metals, when being formed into steel sheets, plates, bars, etc., are subjected to elevated temperatures. Exposure to these temperatures results in the formation of a coating of iron oxide on the metal, commonly called mill scale. Before these formed materials can be subjected to further processing, such as, electroplating, galvanizing, cold rolling, etc., this scale must be removed. In commercial operations, this scale is removed by immersing the sheet, plate or bar in a suitable acid solution, called an acid pickling bath. The acid solution attacks and dissolves the scale. Once the scale is dissolved, the acid is then free for further attack upon the metal. In order to reduce this attack on the metal, corrosion inhibitors are added to the pickling bath solution.

Corrosion inhibitors are required which protect a variety of metals in contact with cleaning solutions based on a variety of acids which are used over a wide temperature range. Acids most commonly used are sulfuric and hydrochloric; acids used for specialty applications include phosphoric, sulfamic, oxalic, tartaric, citric, acetic, and formic.

The combination of rosin amine, ethoxylated rosin amine, ethyloctynol and propargyl alcohol as inhibitors for this application is disclosed in U.S. Pat. No. 3,705,106 to Muzyczko et al. Other effective formulations contain organic sulfur compounds as disclosed in U.S. Pat. Nos. 3,773,675 to Heiss et al., in 3,764,543 to Frenier et al. and in 3,809,655 to Williams.

A search of the prior art failed to uncover any prior art reference which discloses the compositions of the present invention or is especially useful in reducing the corrosive effects on metal piping by acidizing fluids containing inorganic acids.

Thus, in U.S. Pat. No. 4,344,861 to Levy, a method of inhibiting the corrosion of metals in contact with petroleum and petroleum fractions using bis-amides is disclosed. The bis-amides are formed by reacting one or more polyamines with a dimeric acid or with a dicarboxylic acid having from 2–12 carbon atoms. Although no specific dimeric acids are listed, those produced by dimerizing fatty acids of 18 carbon atoms are stated to be of particular interest. The major product, as stated, is a bis-amide although imidazoles might be formed when certain polyamines are used. Unlike the present invention, the corrosion inhibitors of Levy are effective against the naturally occurring corrosives in acidizing fluids and not particularly effective when higher concentrations of acids are added to the acidizing fluid to aid in the producing operation. See Tables I, II and VII to follow, wherein the dimer acid-diethylenetriamine condensate of Levy is shown not to be particularly effective against the corrosive action of acid concentrations of as low as 300 mg/l.

U.S. Pat. No. 3,687,847 to Maddox, Jr. et al. discloses a composition for inhibiting corrosion in oil wells. As with Levy, the composition of Maddox, Jr. et al is particularly effective with naturally occurring corrosives such as, $H_2S$, $CO_2$, $O_2$, brine, and organic acids which are found in natural gas. The composition is formed by first reacting tall oil with a polyamine to yield an imidazole which is then reacted with a dimeric or trimeric fatty acid. The dimer or trimer is formed from a longer chain fatty acid, such as, linoleic or eleostearic, having 18 carbon atoms and then condensed with a polyamine, e.g., imidazoline.

U.S. Pat. No. 3,134,759 to Kirkpatrick et al., discloses a corrosion inhibiting composition comprising the reaction product of tall oil monocarboxy acids with a polyamine to form an intermediate which, in turn, is reacted with only one of the carboxy groups of organic polycarboxy acid containing at least 32 carbon atoms. The resulting product was found useful for protecting well casings from the corrosive action of weak acids, e.g., $CO_2$, $H_2S$, brines, weak inorganic acids, and organic acids, and not the strong inorganic acids normally added to acidizing fluids.

U.S. Pat. No. 2,920,040 to Jolly, discloses a process for inhibiting corrosion of ferrous metals when subjected to corrosive oil well fluid $H_2S$, $CO_2$, and lower organic acids wherein a polyamine is acylated with a monocarboxylic acid, such as, rosin acids or fatty acids, having 8 to 22 carbon atoms. This acylated intermediate forms a salt with an aromatic carboxylic acid.

U.S. Pat. No. 2,646,399, to Hughes, discloses a method for inhibiting corrosion of metals in which a polyamine is reacted with a dibasic acid having 8 or more carbon atoms to form bis-imidazoline. The composition is stated to be useful in inhibiting corrosion resulting from a crude oil/brine mixture.

SUMMARY AND OBJECTS OF THE INVENTION

In view of the foregoing limitations and shortcomings of prior art compositions based on tall oil or other fatty acid derived products, as well as other disadvantages not specifically mentioned above, it should be apparent that there still exists a need in the art for an improved anti-corrosive composition which is effective in acidizing fluids and which will concomittantly protect metal pipes against the corrosive action of those strong inorganic acids which are employed to facilitate a crude oil flow as well as to protect against the corrosive action of agents which are normally present in corrosive fluids. It is, therefore, a primary objective of this invention to fulfill that need by providing an anti-corrosive composition containing the condensation product of a 21 or 22 carbon polycarboxylic acid or acid anhydride with a polyamine.

A further object of the present invention is to provide an anti-corrosive composition, as aforementioned, which protects ferrous metal when subjected to HCl, $H_3PO_4$, and $H_2SO_4$ and which is effective over a wide range of temperatures.

Still another object of this invention is to provide a method for inhibiting the corrosive effects of acids on metal pipes using a composition comprising a synergistic combination of fatty acid/polyamine condensates.

Briefly described, the aforementioned objects are accomplished according to this invention by providing and utilizing condensates of a 21 or 22 carbon polycarboxylic acid or acid anhydride with a polyamine. These condensates may be combined with the condensates of either tall oil or Rosin-S (Rosin-S is a trademark product of Westvaco Corp. and is a medium colored, high softening point tall oil rosin which generally comprises 84% rosin acids and 5% unsaponifiables. It typically has an acid number of 163, a softening point of 73° C., and contains 3% fatty acids) with a polyamine. Additionally, both propargyl alcohol and sulfonated tall oil have been found to enhance further the anti-corrosive effects of the composition of the present invention.

Generally, the polycarboxylic acids employed are diacids or triacids. The ratio of diacid to polyamine by weight, desirably ranges from about 1:1 to about 3:1. The weight ratio of triacid to polyamine desirably ranges from about 1:1 to about 3:1. Additionally, the amount of propargyl alcohol added is generally from about 25 to about 75 parts by weight and preferably about 50 parts by weight per 100 parts by weight of the total corrosion inhibiting composition. When sulfonated tall oil is used as an enhancer, it generally ranges from about 10 to 30 parts per weight of the total composition and preferably is about 20 parts by weight.

A mixture of diacid or triacid and Rosin-S can also desireably be reacted with the polyamine. The ratio of the polyacids to the rosin should be within the range of 10:90 to 90:10 parts by weight. A preferred ratio is about 50:50 parts by weight.

Reaction products of rosin and polyamines are not very soluble in strong inorganic acids such as hydrochloric acid. However, by reacting a blend of diacid or triacid and rosin with a polyamine the resulting product mixture will give a clear solution in hydrochloric acid. The rosin containing amidoamine blends, are the better corrosive inhibitors at higher temperature and exhibit a pronounced and synergistic effect with propargyl alcohol or other acetylenic alcohols.

The anti-corrosive compositions of the present invention are generally added to acidizing fluid at a concentration of generally between 0.01% to 10.0%, by weight, and preferably from about 0.1% to about 2.0%, by weight, depending on the temperature, the type of acid, and the concentration of the acid. The most preferred concentrations of the various inhibitors for the different acids and temperatures are found in the examples. In use, the anti-corrosive properties of the compositions of the present invention were observed with respect to 1010 steel at temperatures as low as 25° C. and as high as 90° C. In addition, the present compositions were found to be effective against the corrosive action of hydrochloric, phosphoric, and sulfuric acids.

With the foregoing and other objects, advantages, and features of the invention that will become hereinafter apparent, the nature of the invention may be more clearly understood by reference to the following detailed description of the invention and to the appended claims.

DETAILED DESCRIPTION OF A PREFERRED EMBODIMENT

The anti-corrosive compositions of the present invention all employ as a starting material a fatty polycarboxylic acid or acid anhydride having 21 or 22 carbon atoms. The polycarboxylic acids or acid anhydrides which have been found to be particularly efficacious starting materials for the anti-corrosive agents of the present invention are the 21 carbon fatty dicarboxylic acid (hereinafter "diacid") and the 22 carbon fatty tricarboxylic acid (hereinafter "triacid"). The diacid is prepared by reacting acrylic acid with conjugated linoleic acid to yield the following general structural formula:

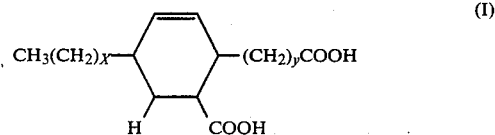

(I)

wherein X and y are integers from 3 to 9, and X and y together equal 12.

The preparation of the diacid (I) is set forth in detail in U.S. Pat. No. 3,753,968 to Ward and assigned to Westvaco, the assignee of the present invention, the disclosure of which is hereby incorporated by reference.

The triacid is prepared by a similar process as the diacid except that fumaric acid (instead of acrylic acid) is reacted with conjugated linoleic acid to yield the following general structural formula:

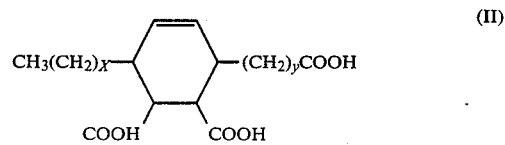

(II)

wherein X and y are integers from 3 to 9, and X and y together equal 12.

The preparation of triacid (II) is set forth in detail in British Pat. No. 1,032,363 and U.S. Pat. No. 3,412,056, both to Crawford.

The diacid (I) and triacid (II) are commonly described by the general structural formula:

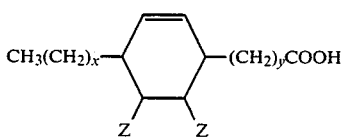

wherein x and y are integers from 3 to 9, x and y together equal 12, one Z is COOH and the remaining Z is selected from the group consisting of H and COOH.

It is not necessary to isolate linoleic acid in order to carry out the above-described reactions. Where a multi-acid composition such as tall oil is used the linoleic acid component of the mixture reacts, and the remaining mono unsaturated fatty acids present in tall oil remain essentially unchanged except for the isomerization of oleic acid to elaidic acid. By distilling off the reamining fatty acids the polycarboxylic acids are enriched in the residue.

A 22 carbon fatty acid anhydride is obtained by a similar process wherein the tall oil fatty acids are heated with maleic anhydride, in the presence of iodine as catalyst, to yield a mixture of anhydrides having a cyclohexene ring system (cyclohexene dicarboxylic acid anhydride type A and a non-cyclic succinic acid anhydride type B and C, carboxy alkenyl succinic anhydride). The conjugated linoleic acid with two double bonds gives the cyclohexene tricarboxylic acid anhydride (III A); the oleic and elaidic acid with one double bond gives the succinic anhydride type triacids (III B and III C). The anhydride mixture formed includes compounds having the following structural formulae:

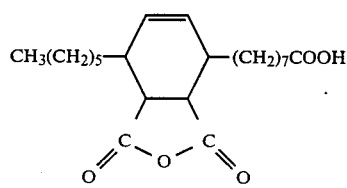
(III A)

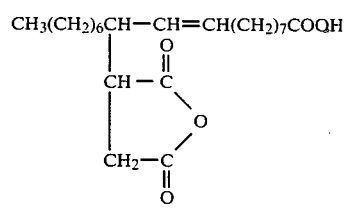
(III B)

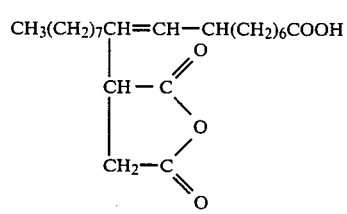
(III C)

The bicyclic Diels-Alder adduct (III A) is disclosed in British Pat. No. 1,032,363 and U.S. Pat. No. 3,412,056 both to Crawford; the "ene" adducts (III B and III C) are disclosed in German Pat. No. 973,398 to Stein et al. and in U.S. Pat. No. 3,451,958 to Riedeman et al.

The above-identified starting compounds ( I, II, III A, III B and III C), namely, diacid, triacid, and their acid anhydrides are reacted with a polyamine such as diethylenetriamine (hereinafter "DETA") and triethyl-enetetramine (hereinafter "TETA") or aminoethylethanolamine (hereinafter "AEEA"), to form an amide condensation product. Since two primary amino groups are available for reacting in the above DETA and TETA, they are more reactive than the secondary amino groups, and it is one of the two terminal amino groups on each polyamine which will react. When one mole of diacid is reacted with two moles DETA, the resulting compound which is formed has the following typical structural formula:

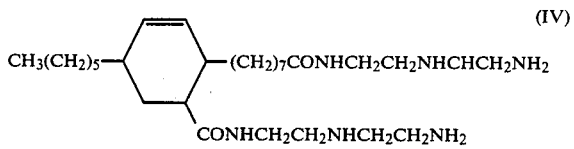
(IV)

When higher temperatures are employed, e.g., from 480° F. to 570° F., the formation of a diimidazoline of the following typical structural formula is expected:

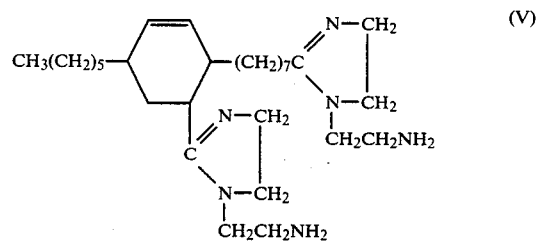
(V)

By using AEEA as the polyamine the terminal NH$_2$ groups are substituted by —OH groups.

However, since the diacid is not obtained in 100% purity and during the condensation reaction some of the DETA boils off with the water of condensation, a complex mixture of amido amine, imidazoline, diimidazoline, diamidoamine and condensates of higher molecular weight are formed as the minor reaction products. In the corrosive tests it was found that those condensates perform best which were synthesized with diacid in excess of DETA, e.g., 2.5:1 (weight basis).

The triacid or the triacid anhydrides react similarly to the diacid. Thus, one of the primary amino groups of the polyamine reacts with the terminal carboxyl groups of the triacid, i.e., the carboxyl groups of the original fatty acids.

Based on the knowledge of the reaction of succinc acid or succinic anhydride or 4-cyclohexene-1,2-dicarboxylic acid and its anhydride and amines or polyamines, and from infrared spectroscopic evidence it appears that first the two remaining carboxyl groups or the anyhydride functionality forms an amine imide of the structure VI A or VI B, vis:

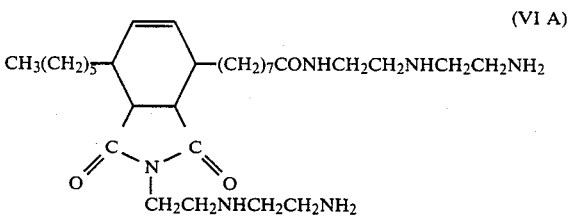
(VI A)

-continued

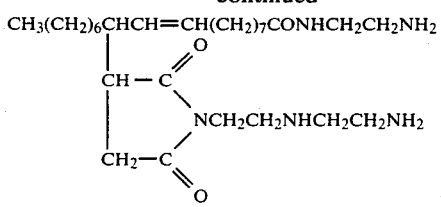
(VI B)

This assumption is supported by the fact that water formed during the reaction is collected at lower temperature than when either diacid or any fatty acid is reacted with a polyamine.

Condensation products of polyamines and the above described polycarboxylic acids and polyamines are disclosed in U.S. Pat. No. 4,447,269 to Schilling et al.

Corrosion inhibiting condensates of the present invention are obtained when combinations of diacid or triacid and tall oil fatty acids, or other fatty acids and Rosin-S are reacted with polyamines. For example, when 2.5 g/500 ml of diacid-DETA condensate was added to a fluid containing 15% hydrochloric acid at 92° C., there was a 0.0363 lbs/ft$^2$ of weight loss after 6 hrs. Under the same conditions, there was only a 0.0297 lbs/ft$^2$ weight loss when the above additive was prepared from a diacid/Rosin-S blend and DETA. Similarly, when 15% sulfuric acid was substituted for 15% hydrochloric acid, there was a weight loss of 0.0842 lbs/ft$^2$ using a condensate of diacid and DETA. However, there was a weight loss of only 0.0811 lbs/ft$^2$ when the polyamine condensate of a diacid-tall oil fatty acid blend was used. The above compositions are generally diluted with either isopropanol or glycol.

The compositions of the present invention have also been found to exhibit a synergistic effect when either propargyl alcohol or sulfonated tall oil were added. Thus, condensates of DETA with a blend of diacid and tall oil fatty acids were added at a rate of 75 mg/250 ml of acidizing fluid containing 30% hydrochloric acid, the resulting weight loss of 1010 steel was 0.0122 lbs/ft$^2$ over a period of 24 hours at 25° C. However, when the 75 mg of additive contained a 1:1 ratio of condensates to propargyl alcohol, the resulting weight loss was only 0.0084 lbs/ft$^2$. In both tests the steel specimen used was identical, i.e., 9 sq. in. (0.0625 sq. ft., approx. 12.5 g).

Similarly, 2.5 g of the same condensate composition per 500 ml of a corrosive fluid containing 15% sulfuric acid resulted in a weight loss of 0.0811 lbs/ft$^2$ of 1010 steel at 92° C. after 6 hrs. However, the resulting weight loss was only 0.0625 lbs/ft$^2$ when the condensate was combined with sulfonated tall oil fatty acid at a ratio of 4:1.

The practice of this invention may be more clearly understood from the following non-limiting illustrative examples. All amounts shown are by weight.

EXAMPLE 1

(Diacid/tall oil fatty acid condensed with DETA)

280 parts tall oil fatty acid and 10-36 parts of acrylic acid were reacted in the presence of a catalytic amount of iodine at 250° C. to form an intermediate. (Formula I). The intermediate formed comprised a 21 carbon dicarboxylic acid in addition to the unreacted tall oil fatty acids. This process is described with greater particularity in U.S. Pat. No. 3,753,968. 10-30 parts of the above intermediates were then reacted with 10 parts, by weight DETA and heated to 260°-270° C. until all the distillate was collected. A mixture of condensates, namely, diacid-DETA and tall oil fatty acid (without linoleic acid, containing mostly oleic acid and elaidic acid) - DETA, as well as diacid-DETA-fatty acid condensates was thereby produced.

EXAMPLE 2

(Diacid condensed with DETA)

The intermediate described in Example 1 was vacuum distilled thereby removing most of the 18 carbon atom monocarboxylic acids (mainly oleic and elaidic). The remaining 21 carbon dicarboxylic acid was then blended with DETA at a ratio of 10-30 parts by weight diacid to 10 parts DETA and heated to 260°-270° C. until all the distillate was collected. The resulting diacid - DETA condensate was then cooled to 100° C. and 100 parts were diluted with 30 to 100 parts of isopropanol or glycol.

EXAMPLE 3

(Diacid/Rosin-S condensed with DETA)

10-90 parts by weight of the diacid were blended with 90-10 parts by weight of Rosin-S. 10-30 parts of that blend were then heated with 10 parts by weight of DETA at 260°-270° C. until all the distillate was collected. The mixture was then cooled to 100° C. and 100 parts were diluted with 30 to 100 parts isopropanol.

EXAMPLE 4

(Triacid/tall oil fatty acid condensed with DETA)

280 parts by weight of tall oil fatty acid and 10-60 parts by weight of fumaric acid were heated to 200°-220° C. for 4-6 hours in the presence of a catalytic amount of iodine. An intermediate having a 22 carbon tri-carboxylic acid (II) as well as the unreacted tall oil fatty acids (containing partially isomerized oleic acid, i.e., elaidic acid) was thereby produced. After cooling, 10-30 parts by weight of this intermediate were heated with 10 parts by weight of DETA to 260°-270° C. until all the distillate was collected.

EXAMPLE 5

(Triacid condensed with DETA)

The intermediate obtained in Example 4 was distilled under reduced pressure thereby removing the monocarboxylic acids (mostly oleic and elaidic). 10-30 parts by weight of the still residue was heated with 10 parts by weight of DETA at 260°-270° C. until all the distillate was collected. After cooling to 100° C., 100 parts of the condensate was diluted with 30 to 100 parts isopropanol.

EXAMPLE 6

(Triacid/Rosin-S condensed with DETA)

10-90 parts by weight of the residue obtained in Example 5 were heated with 90-10 parts by weight of Rosin-S. 10-30 parts by weight of this blend were then reacted with 10 parts by weight of DETA at 260°-270° C. until all the distillate was collected. The condensate was cooled to 100° C. and 100 parts diluted with 30 to 100 parts isopropanol.

EXAMPLE 7

(Tricarboxylic acid anhydride condensed with DETA)

280 parts by weight of tall oil fatty acid such as L-5 (a Westvaco designation of a tall oil fatty acid fraction containing about 5% rosin consisting mostly of linoleic and oleic acid) or 1483 (a Westvaco designation of a distillate removed from the crude diacid containing 3-5% rosin consisting mostly of oleic and elaidic acid) were heated with 100-150 parts by weight of maleic anhydride in the presence of a catalytic amount of iodine or without iodine for 4-10 hours at 180°-220° C. In the presence of iodine, a mixture of anhydrides having a cyclohexene ring system (cyclohexene dicarboxylic acid anhydride type (III A) and a non-cyclic succinic acid anhydride type (III B and III C) were obtained. When reacted without iodine, only succinic acid type anhydrides (III B and III C) were obtained. 10-30 parts by weight of these anhydrides (with some unreacted monocarboxylic acid) were heated to 260°-270° C. until all the distillate was collected. After cooling to 100° C., the condensate was diluted with isopropanol. As shown in Examples 1, 3, 4, and 6, blends of these tricarboxylic acids with Rosin S or tall oil fatty acid may be prepared.

EXAMPLE 8

(Comparison tests)

The compositions of Examples 1, 2, 4, and 7 of the present invention were compared to other anti-corrosive compositions. The corrosion tests were carried out in the following manner:

A 1010 steel coupon (Q-Penel Company, Cleveland, Ohio) having about 9 in. sq. surface area and 12.5 g was rinsed with acetone. After drying the coupon was inserted in to a glass bottle containing 250 ml acidizing fluid (30% HCl) and corrosion-inhibitor. The coupon was removed, rinsed with water and re-weighed after drying.

The tests were carried out using 75 mg of inhibitor per 250 ml of acidizing fluid. The weight loss for the 1010 steel coupon after 24 hours of exposure at 25° C. was then determined. The results are shown in the TABLE I.

TABLE I

CORROSION OF 1010 STEEL IN 30% Hydrochloric Acid at 25° C. (Exposure Time: 24 hrs., INHIBITOR DOSAGE: 75 mg/250 ml)

| | Weight Loss (lbs/sq. ft. × hrs) |
|---|---|
| Controls | |
| Tall Oil Fatty Acid-DETA (2.8:1.0) Condensate | 0.00148 |
| Dimer Acid$^d$-DETA (1.0:1.0) Condensate | 0.00356 |
| Example 1 | |
| DIACID 1550/Tall Oil Fatty Acid$^a$-DETA (1.0:1.5:1.0) Condensate (A) | 0.00051 |
| Example 2 | |
| DIACID 1550(C$_{21}$—dicarboxylic acid)-DETA (2.5:1.0) Condensate | 0.00071 |
| Example 4 | |
| C$_{22}$—Tricarboxylic Acid/Tall Oil Fatty Acid$^c$-DETA (1.0:1.5:1.0) Condensate (B) | 0.00058 |
| Example 7 | |
| C$_{22}$—Tricarboxylic Acid Anhydride/Tall Oil Fatty Acid$^b$-DETA (1.25:1.25:1.0) Condensate | 0.00052 |
| Propargyl Alcohol | 0.00082 |
| Condensate A/Propargyl Alcohol (1:1) | 0.00035 |
| Condensate B/Propargyl Alcohol (1:1) | 0.00037 |

Notes
$^a$The blend is the unrefined mixture of L-5 reacted with 12% acrylic acid by weight.
$^b$Blend prepared from 1483 and maleic anhydride at a ratio 5.6:1.0 without iodine.
$^c$Blend prepared from L-5 with fumaric acid at a ratio of 6.25:1.0 with iodine as catalyst.
$^d$Empol 1010, manufactured by Emery Industries, Inc.

As seen in TABLE I, the compositions of Examples 1, 2, 4, and 7 perform better than propargyl alcohol alone, condensates of tall oil fatty acids and DETA, or condensates of dimer acid and DETA. The improved anti-corrosive effects of the compositions of Examples 1 and 4 is even more pronounced when propargyl alcohol, a commonly used corrosion inhibitor, is mixed therewith at a 1:1 ratio.

EXAMPLE 9

(Comparative tests)

The compositions of Examples 2, 3, 4, 6, and 7 of the present invention were compared to condensates of DETA and dimer acid (Empol 1010, Emery Industries, Inc.) and dimer acid/rosin blends. The tests were carried out using 2.5 g of inhibitor per 500 ml of fluid containing 15% hydrochloric acid at 92° C. In the high temperature test 500 ml acid containing the inhibitor was heated in a 3-necked flask equipped with a condenser and thermometer. The steel coupon was inserted in the corrosion liquid after the predetermined temperature was reached. Weight loss measurements with 1010 steel were made after 6 hrs. exposure time with the results shown in TABLE II.

TABLE II

CORROSION OF 1010 STEEL IN 15% HCl at 92° C. (Exposure Time: 6 hrs, Inhibitor Dosage: 2.5 g/500 ml)

| | Weight Loss (lbs/sq. ft. × hours) |
|---|---|
| DIACID 1550/Rosin S-DETA (1.0:1.0:1.0) Condensate | 0.00495 |
| C$_{19}$—Dicarboxylic Acid$^a$/Rosin S-DETA (1.0:1.0:1.0) Condensate | 0.00578 |
| DIACID 1550-DETA (2.5:1.0) Condensate | 0.00605 |
| C$_{22}$—Tricarboxylic Acid Anhydride$^b$/Rosin S-DETA (1.0:1.0:1.0) Condensate | 0.00623 |
| Diacid 1550-Rosin S-TETA (1.0:1.0:1.0) Condensate | 0.00578 |
| C$_{22}$—Tricarboxylic Acid/Rosin S-DETA (1.0:1.0:1.0) Condensate | 0.00632 |
| C$_{22}$—Tricarboxylic Acid Anhydride$^c$/Rosin S-DETA (1.0:1.0:1.0) Condensate | 0.00858 |
| C$_{22}$—Tricarboxylic Acid/Tall Oil Fatty Acid$^d$-DETA (1.0:1.5:1.0) Condensate | 0.00885 |
| Dimer Acid$^e$-DETA (1.0:1.0) Condensate | 0.01770 |
| Tall Oil Fatty Acid-DETA (2.8:1.0) Condensate | 0.01870 |
| Dimer Acid$^e$/Rosin S-DETA (1.4:1.4:1.0) Condensate | 0.02422 |

Notes
$^a$Supplied by Union Camp Corp.
$^b$C$_{22}$—Tricarboxylic anhydride prepared from L-5 and maleic anhydride at 2.8:1.0, with iodine as catalyst.
$^c$C$_{22}$—Tricarboxylic anhydride prepared from 1483 and maleic anhydride at 2.8:1.0 without iodine.
$^d$Blend prepared from L-5 and fumaric acid at a ratio of 6.5:1.0.
$^e$Empol 1010, manufactured by Emery Industries, Inc.

As seen in TABLE II, the compositions of the present invention are significantly more effective anti-corrosives (at least twice as effective) than conventional dimer acid-DETA condensates or tall oil fatty acid-DETA condensates, and dimer acid/Rosin S-DETA condensates.

EXAMPLE 10

(Comparative Tests)

The compositions of Examples 2, 3, 5, 6, and 7 of the present invention were compared to propargyl alcohol alone as well as to the condensate of Rosin-S and DETA. The tests were carried out as in Example 9, except that the amount of inhibitor was decreased from 2.5 g/500 ml to 0.5 g of amine condensate plus 0.5 g propargyl alcohol per 500 ml of corrosive fluid. The results are shown in TABLE III.

TABLE III

CORROSION OF 1010 STEEL IN 15% HCl at 92° C.
(Exposure Time: 6 hrs., Inhibitor Dosage: 0.5 g Amine Condensate + 0.5 g Propargyl Alcohol/500 ml)

| | Weight Loss (lbs/sq. ft. × hours) |
|---|---|
| Propargyl Alcohol (1.25 g) | 0.0009166 |
| DIACID 1550/Rosin S-DETA (3.0:1.0) Condensate | 0.0003166 |
| Rosin S-DETA (3.0:1.0) Condensate (Turbid)$^a$ | 0.000358 |
| $C_{22}$—Tricarboxylic Acid/Rosin S-DETA (1.0:1.0:1.0) Condensate | 0.000366 |
| Dimer Acid$^b$/Rosin S-DETA (1.4:1.4:1.0) Condensate (Turbid)$^a$ | 0.000383 |
| Diacid 1550/Rosin S-DETA (1.0:1.0:1.0) Condensate | 0.000383 |
| $C_{22}$—Tricarboxylic Acid Anhydride$^c$/Rosin S-DETA (1.0:1.0:1.0) Condensate | 0.0004333 |
| DIACID 1550-DETA (2.5:1.0) Condensate | 0.000667 |
| $C_{22}$—Tricarboxylic Acid-DETA (1.0:1.0) Condensate | 0.000833 |
| $C_{19}$—Dicarboxylic Acid$^d$-DETA (2.0:1.0) Condensate | 0.00135 |

Notes
$^a$Not all of the reactive product is soluble in the acidic fluid.
$^b$Empol 1016 manufactured by Emery Industries, Inc.
$^c$Prepared from 1483 and maleic anhydride at a ratio of 2.8:1.0 without iodine.
$^d$Supplied by Union Camp, Corp.

Even though less than half the amount of additive was used in this example than in Example 9, the compositions of Example 10 were nonetheless more effective corrosion inhibitors due to the synergistic effects which propargyl alcohol has on the condensates of the present invention. It can also be seen that the diacid/Rosin S-DETA condensates of Example 1 are more effective than the dimer acid Rosin S-DETA condensates. Rosin S-DETA and dimer acid-Rosin S-DETA condensates give turbid solutions whereas solutions of the condensates containing diacid/Rosin S or $C_{22}$-tricarboxylic acid (anhydride)/Rosin S blends are clear.

EXAMPLE 11

(Comparative Tests)

The compositions of Examples 1, 4, and 7 were added to a 25° C. corrosive fluid containing 15% phosphoric acid at a rate of 75 mg/250 ml. After 170-190 hours of exposure, the weight loss of 1010 steel was measured. The results are shown in TABLE IV:

TABLE IV

CORROSION OF 1010 STEEL IN 15% PHOSPHORIC ACID AT 25° C.
(Exposure Time: 170-190 hrs., Inhibitor Concentration: 75 mg/250 ml)

| | Weight Loss (lbs/sq. ft. × hours) |
|---|---|
| DIACID 1550/Tall Oil Fatty Acid$^a$-DETA (1.0:1.5:1.0) Condensate | 0.000050 |
| $C_{22}$—Tricarboxylic Acid Anhydride/Tall Oil Fatty Acid$^b$-DETA (1.0:1.5:1.0) Condensate | 0.000067 |
| $C_{22}$—Tricarboxylic Acid$^c$/Tall Oil Fatty Acid-DETA (1.0:1.5:1.0) Condensate | 0.000067 |

Notes
$^a$The blend is the unrefined mixture of L-5 reacted with 12% acrylic acid (by weight)
$^b$Blend prepared from 1483 and maleic anhydride at a ratio 5.6:1.0 without iodine.
$^c$Blend prepared from L-5 with fumaric acid at a ratio of 6.25:1.0 with iodine as catalyst.

EXAMPLE 12

(Comparative Tests)

The compositions of Examples 2, 3, and 6 of the present invention were compared with the condensates of Rosin S and tetraethylenetriamine (TETA) as well as the condensates of tall oil fatty acid/Rosin S with DETA. The tests were carried out using 1 g. of inhibitor per 500 ml of corrosive fluid containing 15% phosphoric acid at a temperature of 92° C. After 6 hours, the resulting weight loss to 1010 steel was measured and the results are shown in TABLE V.

TABLE V

CORROSION OF 1010 STEEL IN 15% PHOSPHORIC ACID AT 92° C. (Exposure Time: 6 hrs., Inhibitor Dosage: 1 g/500 ml)

| | Weight Loss (lbs/sq. ft. × hours) |
|---|---|
| Rosin S-TETA (2.0:1.0) Condensate (Turbid) | 0.00377 |
| DIACID 1550/Rosin S-DETA (1.0:1.5:1.0) Condensate | 0.00620 |
| $C_{22}$—Tricarboxylic Acid/Rosin S-DETA (1.0:1.0:1.0) Condensate | 0.00627 |
| $C_{19}$—Dicarboxylic Acid/Rosin S-DETA (1.0:1.0:1.0) Condensate | 0.00838 |
| DIACID 1550-DETA (2.5:1.0) Condensate | 0.01032 |
| Tall Oil Fatty Acid$^b$/Rosin S-DETA (1.27:1.27:1.0) Condensate (Turbid) | 0.01148 |

Notes
$^a$Supplied by Union Camp Corp.
$^b$Tall oil fatty acid: L-5

As seen in TABLE V, the compositions of the present invention give clear solutions and are more effective than the condensates of tall oil fatty acid/Rosin S with DETA.

EXAMPLE 13

(Comparative Tests)

The compositions of Examples 1, 4, and 7 of the present invention were tested in a corrosive fluid containing 15% sulfuric acid at 25° C. at a rate of 0.8 g of inhibitor per 250 ml. of fluid. After 171 hours of exposure, the weight loss of 1010 steel was determined, and the results are shown in TABLE VI.

TABLE VI

CORROSION OF 1010 STEEL IN 15%
SULFURIC ACID AT 25° C. (Exposure
Time: 171 hrs., Inhibitor Dosage: 0.8 g/250 ml)

|  | Weight Loss (lbs/sq. ft. × hours) |
|---|---|
| $C_{22}$—Tricarboxylic Acid/Tall Oil Fatty Acid$^a$-DETA (1.0:1.5:1.0) Condensate | 0.000022 |
| $C_{22}$—Tricarboxylic Anhydride/Tall Oil Fatty Acid$^b$-DETA (1.0:1.5:1.0) Condensate | 0.000032 |
| DIACID 1550/Tall Oil Fatty Acid$^c$-DETA Condensate (1.0:1.5:1.0) | 0.000036 |

Notes
$^a$Blend is prepared from L-5 with fumaric acid at a ratio of 6.25:1.0 with iodine as catalyst.
$^b$Blend is prepared from 1483 with maleic anhydrate at a ratio of 5.6:1.0 without iodine.
$^c$The blend is the unrefined mixture of L-5 reacted with 12% acrylic acid by weight.

EXAMPLE 14

(Comparative Tests)

The compositions of examples 1, 2, 4, and 7 of the present invention were tested under the same conditions as Example 9 except that sulfuric acid was substituted for hydrochloric acid. The weight loss of 1010 steel was then determined, and the results are shown in TABLE VII.

TABLE VII

CORROSION OF 1010 STEEL IN 15%
SULFURIC ACID AT 92° C. (Exposure
Time: 6 hrs., Inhibitor Dosage: 2.5 g/500 ml)

|  | Weight Loss (lbs/sq. ft. × hours) |
|---|---|
| $C_{22}$—Tricarboxylic Acid/Tall Oil Fatty Acid$^a$-DETA (1.0:1.5:1.0) Condensate (A) | 0.0118 |
| DIACID 1550/Tall Oil Fatty Acid$^b$-DETA (1.0:1.5:1.0) Condensate (C) | 0.0135 |
| DIACID 1550-DETA (2.5:1.0) Condensate | 0.0140 |
| Tall Oil Fatty Acid-DETA (2.8:1.0) Condensate (imidazoline) | 0.0172 |
| $C_{22}$—Tricarboxylic Anhydride/Tall Oil Fatty Acid$^a$-DETA (1.0:1.5:1.0) Condensate (B) | 0.0175 |
| Dimer Acid$^d$-DETA (1.0:1.0) Condensate | 0.0386 |
| Propargyl Alcohol | 0.0704 |
| Condensate A/Propargyl Alcohol (1:1) | 0.00407 |
| Condensate B/Propargyl Alcohol (1:1) | 0.0051 |
| Condensate C/Propargyl Alcohol (1:1) | 0.00407 |
| Condensate C/Sulfonated Tall Oil Fatty Acid (4.0:1.0) | 0.01042 |

Notes
$^a$Blend derived by reacting L-5 with fumaric acid at a ratio 6.25:1 in the presence of iodine.
$^b$Unrefined mixture of L-5 reacting with 12% acrylic acid by weight.
$^c$Blend derived by reacting 1483 with maleic anhydride at a ratio 5.6:1.0
$^d$Empol 1010 manufactured by Emery Industries, Inc.

From the foregoing, it will be appreciated that the compositions of the present invention are at least twice as effective as the condensate of dimer acid and DETA. They are also substantially more effective than the imidazoline condensate of tall oil fatty acid and DETA. The enhancing effect of using the compositions of Examples 1, 4, and 7 in a 1:1 ratio with propargyl alcohol can also be clearly seen. Additionally, the use of the Example 7 composition with sulfonated tall oil fatty acid at a ratio of 4:1 results in a highly effective anti-corrosive composition. These anti-corrosive compositions can also be used in other applications where steel or ferrous metal is brought into contact with strong acidic fluids, such as in pickling baths or industrial cleaning.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A composition for inhibiting the corrosive effects of acids on steel or ferrous metal surfaces exposed to an acidic corrosive fluid comprising a condensate of a polyamine with a polycarboxylic acid selected from the group consisting of the general formula $$CH_3(CH_2)_x-\underset{Z\ \ Z}{\bigcirc}-(CH_2)_yCOOH$$

wherein x and y are integers from 3 to 9, x and y together equal 12, one Z is COOH and the remaining Z is selected from the group consisting of H and COOH, the anhydrides of said general formula and mixtures thereof and further comprising propargyl alcohol in an amount of from about 25 to about 75 parts per 100 parts by weight of the total corrosion inhibiting composition.

2. The corrosion inhibiting composition according to claim 1 wherein said polyamine is a compound selected from the group consisting of diethylenetriamine, triethylenetetramine, and aminoethylethanolamine.

3. The corrosion inhibiting composition according to claim 2 wherein 10-30 parts by weight of said polycarboxylic acid are condensed with 10 parts of diethylenetriamine.

4. The corrosion inhibiting composition according to claim 1, wherein the condensate is formed by reacting the polyamine with a blend of the polycarboxylic acid and tall oil fatty acid wherein the blend is formed by reacting 280 parts tall oil fatty acid with 10-36 parts acrylic acid in the presence of a catalytic amount of iodine at 250° C. said parts being parts by weight.

5. The corrosion inhibiting composition according to claim 4 wherein 10 parts of diethylene triamine is condensed with 10-30 parts of the blend having 10-90 parts of said polycarboxylic acid and 90-10 parts of tall oil fatty acids said parts being parts by weight.

6. The corrosion inhibiting composition according to claim 2 wherein the condensate is formed by reacting the polyamine with a blend of the polycarboxylic acid and a tall oil rosin comprising 84% rosin acids and 5% unsaponifiables wherein the weight ratio of polycarboxylic acid to tall oil rosin is from 10:90 to 90:10.

7. The corrosion inhibiting composition according to claim 6 wherein 10 parts of diethylenetriamine is condensed with 10-30 parts of the blend having 10-90 parts of said polycarboxylic acids and 90-10 parts of a tall oil rosin comprising 84% rosin acids and 5% unsaponifiables said parts being parts by weight.

8. The corrosion composition according to claim 1 wherein said polycarboxylic acid is a 21 carbon dicarboxylic acid compound of the formula:

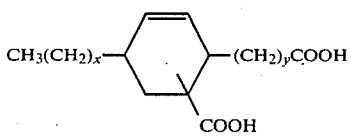

wherein x and y are integers from 3 to 9 and x and y together equal 12.

9. The corrosion composition according to claim 8 wherein x is 5 and y is 7.

10. The composition according to claim 1 wherein said polycarboxylic acid is a 22 carbon tricarboxylic acid compound of the formula:

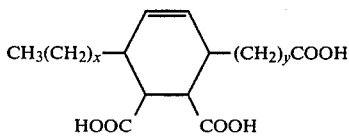

wherein x and y are integers from 3 to 9 and x and y together equal 12.

11. The corrosion composition according to claim 10 wherein x is 5 and y is 7.

12. The corrosion inhibiting composition according to claim 1 wherein said anhydride is a 22 carbon tricarboxylic acid anhydride compound of the formula:

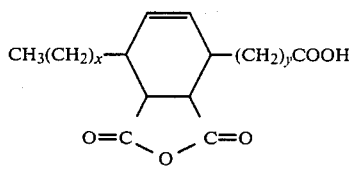

wherein x and y are integers from 3 to 9; and x and y together equal 12.

13. The corrosion composition according to claim 12 wherein x is 5 and y is 7.

14. A method of protecting metals from the corrosive effects of acids used for acidizing and fracturing in oil well stimulation comprising the step of adding to said acids an effective amount of a condensation product of a polyamine with a polycarboxylic acid selected from the group consisting of the general formula

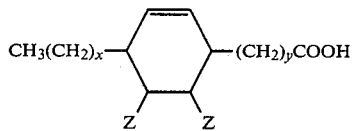

wherein x and y are integers from 3 to 9, x and y together equal 12, one Z is COOH and the remaining Z is selected from the group consisting of H and COOH, the anhydrides of said general formula and mixtures thereof.

15. The method according to claim 14 wherein said acids used for acidizing and fracturing in oil well stimulation are selected from the group consisting of HCl, $H_3PO_4$, and $H_2SO_4$, employed alone or in combination with hydrofluoric acid or acetic acid.

16. The method according to claim 14 wherein the polycarboxylic acids and polyamine are present at a ratio of from about 1-3 to about 1 by weight, respectively.

17. The method according to claim 14 wherein propargyl alcohol is added to said acids in an amount of from about 25 to about 75 parts per 100 parts by weight of the total of said condensation product plus said propargyl alcohol.

18. The method according to claim 14 wherein said polycarboxylic acid is a 21 carbon dicarboxylic acid compound of the general formula

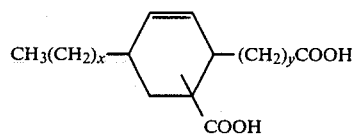

wherein x and y are integers from 3 to 9 and x and y together equal 12.

19. The method according to claim 14 wherein said polycarboxylic acid is a 22 carbon tricarboxylic acid compound of the general formula

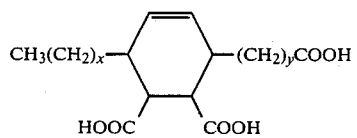

wherein x and y are integers from 3 to 9 and x and y together equal 12.

20. The method according to claim 14 wherein the polycarboxylic acid includes a mixture of 21 carbon dicarboxylic and 22 carbon tricarboxylic acids.

21. The method according to claim 19 including adding to said acids propargyl alcohol in an amount of from about 25 to about 75 parts per 100 parts by weight of the total of said condensation product plus said propargyl alcohol.

22. The method according to claim 20 including adding to said acids propargyl alcohol in an amount of from about 25 to about 75 parts per 100 parts by weight of the total of said condensation product plus said propargyl alcohol.

23. The method according to claim 14 comprising a 21 carbon dicarboxylic acid anhydride.

24. The method according to claim 14 comprising a 22 carbon tricarboxylic acid anhydride.

25. The method according to claim 14 wherein the concentration of said condensation product employed ranges from 0.01% to 10% by weight of the corrosive fluid.

26. The method according to claim 14 wherein the concentration of said condensation product employed is about 0.1-2% by weight of the corrosive fluid.

27. The method according to claim 26 further including adding to said acids propargyl alcohol in an amount of from about 25 to about 75 parts per 100 parts by weight of the total of said condensation product plus said propargyl alcohol.

28. The method according to claim 27 further including adding to said acids propargyl alcohol in an amount of from about 25 to about 75 parts per 100 parts by weight of the total of said condensation product plus said propargyl alcohol.

* * * * *